United States Patent [19]

Moorehead

[11] Patent Number: 5,401,397
[45] Date of Patent: Mar. 28, 1995

[54] FILTER SYSTEM FOR A LIQUID STREAM WITH AUTOMATIC RAPID BACK FLUSH CAPABILITY

[75] Inventor: Jack Moorehead, San Diego, Calif.
[73] Assignee: Automatic Control, San Diego, Calif.
[21] Appl. No.: 47,823
[22] Filed: Apr. 15, 1993
[51] Int. Cl.$^6$ ............................................. B01D 36/00
[52] U.S. Cl. ................... 210/108; 210/111; 210/117; 210/253; 210/258; 210/427
[58] Field of Search ............... 210/741, 798, 108, 253, 210/258, 340, 425, 427, 512.1, 136, 411, 416.1, 420, 104, 105, 111, 116, 117

[56] References Cited

U.S. PATENT DOCUMENTS

| | | | |
|---|---|---|---|
| 4,818,420 | 4/1989 | Mins | 210/798 |
| 4,923,068 | 5/1990 | Crowson | 210/108 |
| 5,013,457 | 5/1991 | Mins | 210/741 |
| 5,149,449 | 9/1992 | Strid et al. | 210/798 |

*Primary Examiner*—Robert A. Dawson
*Assistant Examiner*—W. L. Walker
*Attorney, Agent, or Firm*—John R. Duncan; Frank D. Gilliam

[57] ABSTRACT

A system for filtering a liquid stream, typically drinking water from a natural source. The system includes a plurality of filter stations, each of which receives at least a portion of the influent liquid flow, passes the flow through a filter and passes the filtered liquid to an affluent line. When the filter has reached its capacity for removing particulate material from the liquid flow, preferably as determined by measurements of pressure drop across the filter media, a small quantity of the clean affluent liquid is passed through the filter in a reverse direction to back flush the filter media, with the flush liquid directed to a waste water line. Back flushing can be accomplished automatically under microprocessor control, using signals from a filter media pressure sensor. With a plurality of parallel filter arrangements, continuous flow to the affluent line is easily maintained, since the back flush cycle is short and all filter sets would not be in the back flush mode at the same time. The filter has a porous tubular core bearing filter media on the core surface. The core is housed in a canister having an entrance directing influent liquid into the canister tangential to the core and an affluent line connected to the interior of the core. This configuration provides improved filter media life and efficient reverse flow during back flushing.

14 Claims, 2 Drawing Sheets

FILTER SYSTEM FOR A LIQUID STREAM WITH AUTOMATIC RAPID BACK FLUSH CAPABILITY

BACKGROUND OF THE INVENTION

This invention relates in general to liquid filter systems and, more specifically to a system for filtering particulate material from a liquid stream providing improved filter life and automatic high efficiency back flushing without interrupting flow through the system.

A great many small rural communities presently use surface water from streams or rivers for their municipal drinking water supply. Due to perceived increases in water pollution, increasingly stringent limits are being required on chemical contaminates and parasites in drinking water. This is requiring increased water treatment, including greater removal of particulate contaminates from the water. In small water treatment plants used by small communities, low cost and low maintenance are required if new water treatment plants are to be affordable.

Many older water treatment plants use dual-media sand filtration systems that are no longer acceptable under the new water quality standards. In some cases, these systems can meet the standards, but only through the use of properly mixed polymer chemical filter aids. The required expensive and complex polymer chemical mixing equipment requires constant attention, since the amount of the chemicals being added to raw water must be frequently readjusted to match the continually changing chemistry of the water being filtered. Most small rural water districts cannot afford to both purchase these sophisticated dual-media systems and provide the full time engineers required to operate and maintain these systems.

Many small rural water districts are trying to avoid these high costs by merging with other districts or drilling wells. Where the costs of such interconnections or wells is excessive, under present regulations, they may install slow sand filters. Most slow sand filters require minimum maintenance and can operate for weeks without cleaning.

Unfortunately, recent particle count studies show that both dual-media and slow sand filters fail to meet water quality standards for hours, several days or even months after each backwash cleaning. Contaminates have been found to pass through a sand filter whenever water flow rates are changed and whenever the pump is stopped and turned on again. In order to meet standards, it may be necessary to pump filtered water to waste after every backwash cycle, disposing of thousands of gallons of water, until the filter "ripens" or compacts.

Thus, there is a continuing need for improved liquid filtering systems, especially for use in small water treatment facilities, that will be highly efficient, require little or no monitoring, will automatically backwash as required without interrupting overall water flow and will not waste excessive liquid during the back flush cycle.

SUMMARY OF THE INVENTION

The above-noted problems, and others, are overcome in accordance with this invention by a liquid filtration system using one or more filter sets, each comprising a high efficiency filter and associated plumbing, sensing and control apparatus. Each filter has a canister housing a porous tubular core bearing filter media with an influent line for introducing liquid into the canister tangentially to the core and an affluent line for discharging liquid from within the core. A valve system is provided for directing liquid from an influent pipe through the filter to an affluent pipe during normal filter operation and for directing clean affluent liquid in a reverse direction from the affluent pipe to a waste water pipe during back flush operation. The tangential or swirling flow of liquid between the canister inner wall and the core causes a boundary layer effect, resulting from molecules of the liquid dragging across the filter surface, pulling or pushing trapped particles away from the openings or pores in the filter surface, allowing additional liquid to pass through the filter media before it becomes completely blocked by suspended particles in the influent liquid.

The overall system, which may include a plurality of filter system sets in parallel, is preferably controlled by a conventional microprocessor, although it can be manually controlled if desired. A sensor system is provided for measuring pressure drop across the filter media. Differential pressure is directly proportional to the liquid flow rate. The differential pressure can be compared manually or by the microprocessor with known (previously determined by tests) flow rates to determine the flow rate of each filter set in the system. When the pressure drop is excessive, indicating that the filter has reached capacity, the back flush cycle is initiated, either under manual or microprocessor control. Rapid back flushing at the proper point requires a relatively small amount of clean affluent liquid, so little of the clean liquid is lost during each back flush cycle.

While a single filter set could be used, it is preferred that at least two, and often many more, be used in parallel. Continuous affluent liquid flow can be maintained at all times by assuring that all filter sets are not in the back flush mode at the same time. Where at least one filter set is in the operating mode, water hammer problems which might occur upon closing and opening of valves are eliminated because of ability of the flowing stream to absorb sudden pressure changes in individual filter sets. As the needs of a delivery system increase, additional filter sets can be easily installed.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
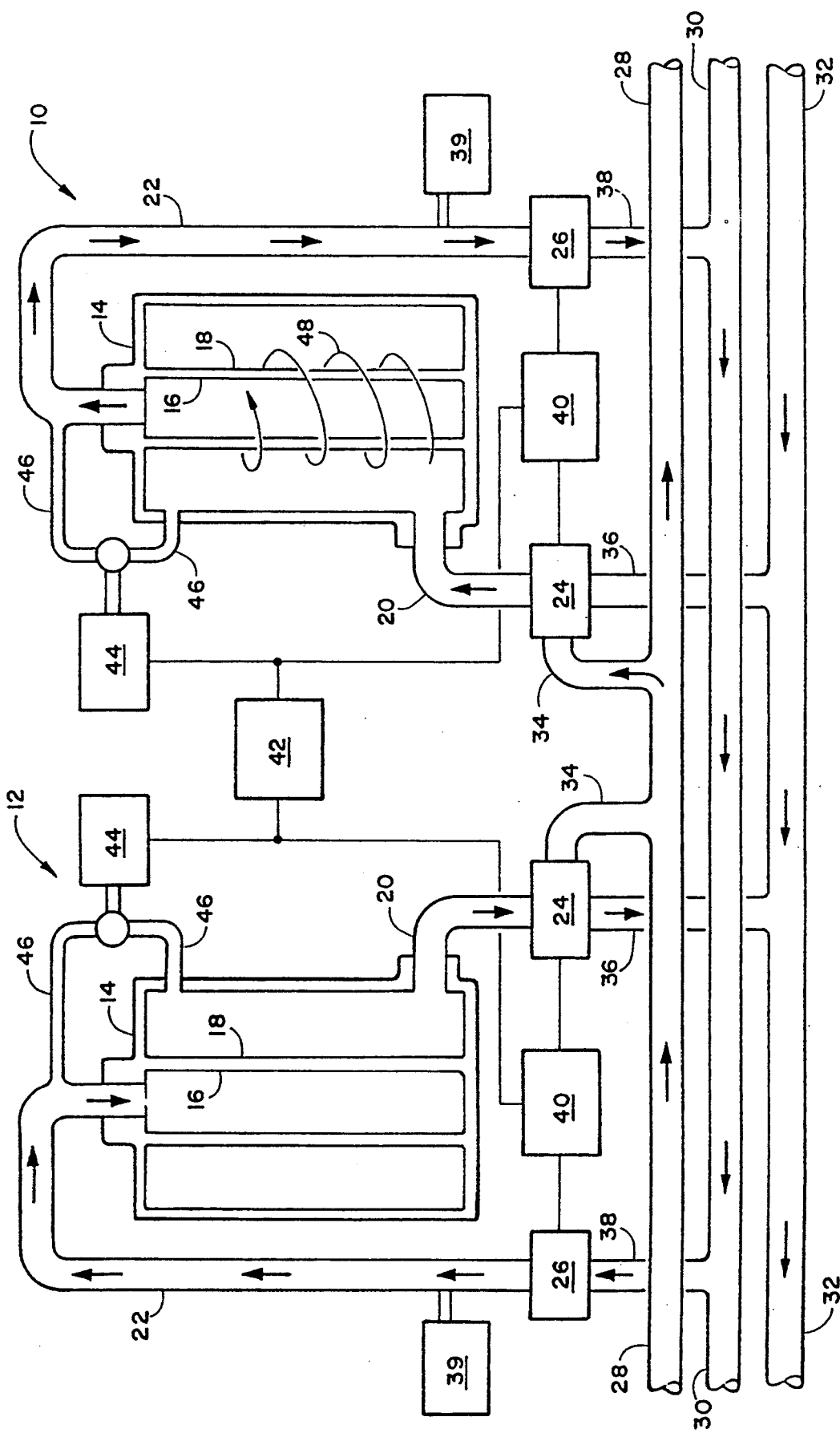
FIG. 1 is a schematic diagram of a filtering system with at least two filter sets, one shown in the operating mode and the other in the back flush mode.

Referring now to FIG. 1 there is seen a filtering system including two filter sets 10 and 12 which are structurally substantially identical. As shown in FIG. 1, filter set 10 is in the filtering operation mode and set 12 in the back flush mode, as indicated by the fluid flow arrows in the various conduits. Each set 10 and 12 includes a filter canister 14, preferably of cylindrical shape.

Within each canister 14 a porous tube 16 is installed between the top and bottom. Any suitable porous material may be used, such as woven metal cloth, screen or perforated metal or other material that has the desired porosity and strength to resist the flow of liquids therethrough. The outer surface of each tube 16 is covered with a selected filter media. Any suitable filter media may be used, such as sintered stainless steel or the like suitable for the purpose intended.

A first canister conduit 20 is connected to each canister 14 outside tube 16 and a second canister conduit 22 is connected to each canister 14 at the end, in communication with the interior of tube 16. The opposite ends of each first canister conduit 20 and second canister conduit 22 are each connected to a first valve 24 and second valve 26, respectively.

The filter system cooperates with three pipes in a conventional liquid processing facility, such as a drinking water treatment plant, namely an influent pipe 28 carrying liquid to be filtered, an affluent pipe 30 carrying filtered water from the system and a waste pipe 32 receiving back flush liquid from the system and typically carrying waste to a sewage treatment plant.

Each first valve 26 is connected to influent pipe 28 by an influent conduit 34 and to waste pipe 32 by a waste conduit 36. Each second valve 26 is connected to affluent pipe 30 by an affluent conduit 36. Any suitable valves may be used. Solenoid valves are preferred, especially in a computer-controlled system for ease of automatic operation. A source of high pressure gas 38, such as an air compressor or tank of compressed gas, is connected to each second valve 26 for use in back flushing the filter, as detailed below. While two gas sources 38 may be used as shown, generally a single source can serve all of the valves 26.

A controller 40 is provided to control each of valves 24 and 26 in each set. While the controller 40 could be manual valve operating means, for optimum results automatic control through a conventional microprocessor 42. Typical microprocessors include the IBM compatible 286 or the like commercially available. Each filter set 10 and 12 includes a sensor assembly including tubes 46 connected to second canister conduit 22 and canister 14 so as to measure pressure drop across filter media 18. When pressure drop is excessive, sensor 44 sends a corresponding signal to microprocessor 42 which the initiates the back flush cycle, as described below. In a manual system, sensors 44 could include a simple pressure gauge so that an operator could manually actuate the back flush cycle when excess pressure drop is observed.

Filter set 10 illustrates operation of the system during normal filtering operations. Flow of influent liquid to be filtered enters influent conduit 34 from influent pipe 28, passes through valve 24 and first canister conduit 20 to filter canister 14. The configuration of canister 14 and conduit 20 is such (as described below) to cause a swirling action of the liquid within canister 14, as indicated by arrow 48. The liquid passes through filter media 18 into porous tube 16, then out through second canister conduit 22, through valve 26 and final through affluent conduit 36 to affluent pipe 30. Valves 24 and 26 may be any suitable valves. For efficiency and quick action, especially when under automatic control, solenoid valves are preferred.

When sensor 44 indicates that the filter is clogged, as indicated by excessive pressure drop across the filter, valves 24 and 26 are moved, either manually or automatically under the control of microprocessor 42, to the position producing the back flush operation illustrated by filter set 12. Valve 26 closes off flow to affluent conduit 36 and opens the connection to high pressure gas source 38, while valve 24 closes off flow of influent liquid through influent conduit 34 and opens the path from first canister conduit 20 to waste conduit 36.

Gas, typically air, under pressure from source 38 forces clean, filtered, liquid within second canister conduit 22 back into porous tube 16, out through filter media 18, through first canister conduit 20, valve 24 and waste conduit 36 to waste pipe 32, as indicated by the arrows in these conduits. The mixture of air and clean liquid forced from conduit 22 through the filter media quickly and thoroughly removes particulate from the filter media. The system is then manually or automatically returned to the configuration shown in filter set 10 and filtering continues.

In many cases, additional filter sets corresponding to sets 10 and 12 will be used in parallel. Generally, most will be in the operational mode at any given time, with only one or a very few in the back flush mode. Thus, there will always be a continuous flow in the system and water hammer resulting from the use of quick opening and closing valves will be easily absorbed by the system.

Figure 3:
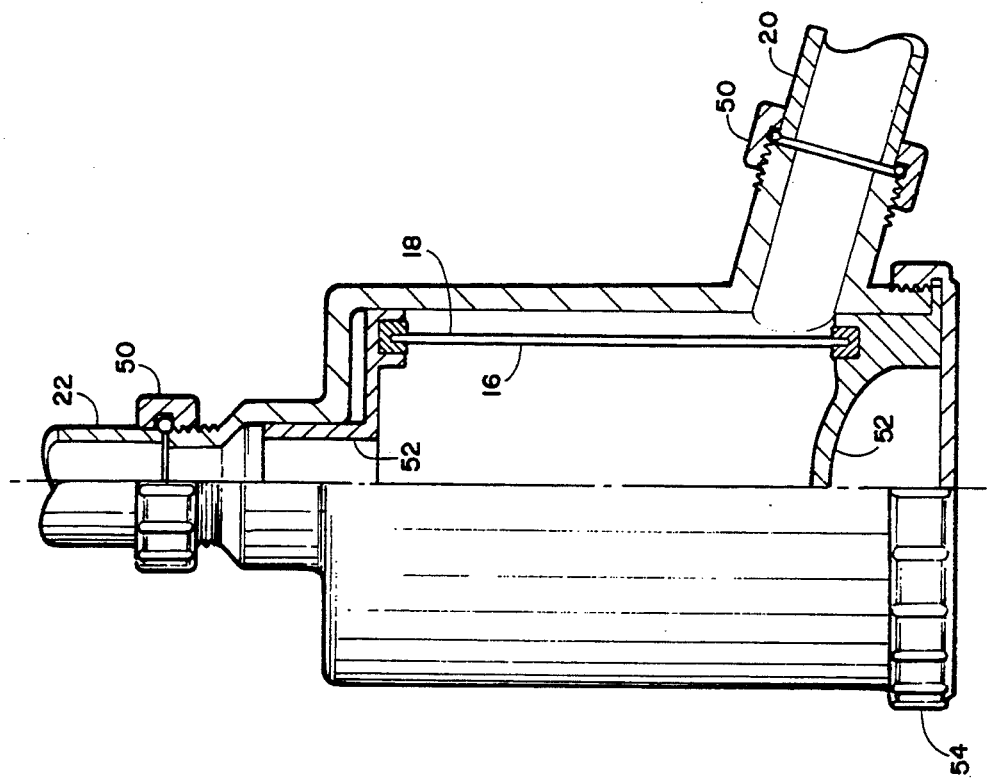
FIG. 3 is a schematic elevation view, partially cutaway, of the filter canister of FIG. 2.
Figure 2:
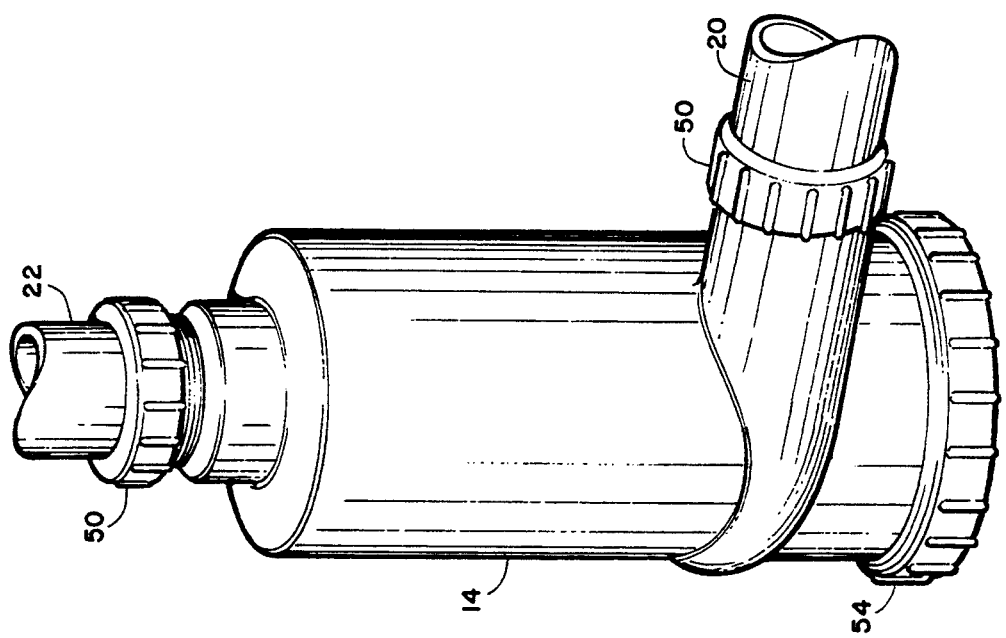
FIG. 2 is a perspective view of a filter canister.

For optimum filter efficiency in this filter system, the filter canister configuration shown in FIGS. 2 and 3 is preferred. Canister 14 is generally cylindrical in shape, with the connection from first conduit 20 through which influent liquid enters approximately tangential to the canister cylinder, and preferably angled from 10 to 30 degrees relative to the cylinder axis, angled toward the second conduit, as best seen in FIG. 3. This causes a swirling action in the incoming liquid around the porous tube 16 and filter media 18 within the canister. This has been found to cause a boundary layer effect, with water molecules dragging across the filter surface, pulling or pushing any trapped particles from the openings or pores in the filter surface, which allows additional liquid to pass through the filter media 18 before it becomes completely blocked by particles and allows uniform use of the entire filter surface.

Conventional threaded compression fittings 50 clamp and seal around conduits 20 and 22. Porous tube 16 and filter media 18 are supported by end support mounts 52 which fit snugly within canister 14. A full diameter threaded cap 54 is provided at the bottom of canister 14 to permit removal and replacement of tube 16, media 18 and supports 52.

Other applications, variations and ramifications of this invention will occur to those skilled in the art upon reading this disclosure. Those are intended to be included within the scope of this invention, as defined in the appended claims.

I claim:

1. A high efficiency liquid filter system which comprises at least one filtering set which comprises:
   a filter canister containing a filter media;
   a first canister conduit penetrating said canister generally tangentially to said canister at an angle of from about 10 to 30 degrees to the canister axis said canister for liquid flow into said canister in a direction tangential to said filter media and out of said canister on one side of said filter media;
   a second canister conduit connected to said canister for liquid flow into and out of said canister on the opposite side of said filter media;
   a first valve assembly for selectively directing liquid flow from an influent pipe to said first canister conduit during filtering operation and directing liquid from said second canister conduit to a waste pipe during back flush operation;

a source of high pressure gas;

a second valve assembly adapted to selectively direct liquid from said second canister conduit to an affluent pipe during filtering operation and a mixture of gas from said high pressure gas source and liquid in said affluent pipe to said second canister conduit during back flush operation;

sensing means for sensing pressure drop across said filter media during filtering operation; and means for selecting the operational mode of said first and second valves in accordance with the sensed pressure drop across said filter media including microprocessor means for receiving said sensed pressure drop and for operating said valves to back flush said filter media for a selected period at a selected degree of pressure drop.

2. The system according to claim 1 wherein said system includes at least two of said filter sets, whereby at least one set may be operated in the filtering mode at all times.

3. The system according to claim 1 wherein said filter canister is generally cylindrical in shape, said filter media is formed on a porous tube within said canister and said first canister conduit penetrates the canister adjacent to one end outside said tube and said second canister conduit penetrates said canister axially within said tube.

4. A high efficiency liquid filter system which comprises at least one filtering set, each of which comprises:

a generally cylindrical filter canister containing a porous tubular filter media within said canister;

a first canister conduit connected to said canister adjacent to one end of said canister outside said tubular filter media and generally tangential to Said tubular filter media for liquid flow into and out of said canister on one side of said filter media;

a second canister conduit connected to said canister axially within said tube for liquid flow into and out of said canister on the opposite side of said filter media;

a first valve connected to said first canister conduit;

a second valve connected to said second canister conduit;

an influent conduit connected to said first valve and adapted to be connected to an influent pipe;

a waste conduit connected to said first valve and adapted to be connected to a waste pipe;

an affluent conduit connected to said second valve and adapted to be connected to an affluent pipe;

a pressurized air line connected to said second valve;

said first valve adapted to selectively connect said influent conduit to said first conduit to permit liquid to flow to said filter canister during filtering operation and connect said first canister conduit to said waste conduit during back wash operation to permit back wash liquid to flow from said filter canister to said waste pipe;

said second valve adapted to selectively connect said second canister conduit from said filter canister to said affluent conduit during filtering operation to direct filtered liquid to said affluent pipe and to connect said air line to said second canister conduit to force clean affluent and air through said canister during back flush operation.

5. The system according to claim 4 further including sensing means for sensing pressure drop across said filter media during filtering operation;

means for selecting the operational mode of said first and second valves in accordance with the sensed pressure drop across said filter media.

6. The system according to claim 5 wherein said means for selecting the operational mode of said first and second valves includes microprocessor means for receiving said sensed pressure drop and for operating said valves to back flush said filter media for a selected period at a selected degree of pressure drop.

7. The system according to claim 4 wherein said system includes at least two of said filter sets, whereby at least one set may be operated in the filtering mode at all times.

8. The system according to claim 4 wherein said first canister conduit is connected to said canister generally tangentially to said canister and tube at an angle of from about 10 to 30 degrees to the canister axis.

9. A high efficiency filter canister for filtering particles from a liquid stream which comprises:

an elongated housing;

a porous tube within said housing extending lengthwise of said housing and isolating the interior of said tube from the volume between said tube and the interior wall of said housing;

a quantity of filter media covering the exterior of said porous tube;

an outlet tube connected in fluid flow arrangement with the interior of said tube;

an inlet tube connected in fluid flow arrangement with the volume outside the tube; and said inlet tube positioned approximately tangential to said porous tube and angled slightly toward the outlet tube connection;

whereby liquid entering through said inlet tube will swirl along the surface of said filter media to substantially uniformly spread particles over the filter media.

10. The filter canister according to claim 9 wherein said inlet tube is positioned at an angle to the canister axis of from about 10 to 30 degrees.

11. The filter canister according to claim 9 further including a capped opening coaxial with said porous tube and having a size sufficient to permit removal and replacement of said porous tube therethrough.

12. A high efficiency liquid filter system which comprises at least one filtering set which comprises:

a filter canister containing a generally tubular filter media;

a first canister conduit connected generally tangentially to said canister and said tubular filter media for liquid flow into and out of said canister on one side of said filter media;

a second canister conduit connected to said canister for liquid flow into and out of said canister on the opposite side of said filter media;

a first valve assembly for selectively directing liquid flow from an influent pipe to said first canister conduit during filtering operation and directing liquid from said second canister conduit to a waste pipe during back flush operation;

a source of high pressure gas;

a second valve assembly adapted to selectively direct liquid from said second canister conduit to an affluent pipe during filtering operation and gas from said high pressure gas source to said second canister conduit during back flush operation;

sensing means for sensing pressure drop across said filter media during filtering operation; and selection means for selecting the operational mode of said first and second valves in accordance with the sensed pressure drop across said filter media, said selection means comprising microprocessor means for receiving said sensed pressure drop and for operating said valves to back flush said filter media for a selected period at a selected degree of pressure drop.

13. The system according to claim 12 wherein said system includes at least two of said filter sets, whereby at least one set may be operated in the filtering mode at all times.

14. The system according to claim 12 wherein said filter canister is generally cylindrical in shape, said filter media is formed on a porous tube within said canister and said first canister conduit penetrates the canister adjacent to one end outside said tube and said second canister conduit penetrates said canister axially within said tube.

* * * * *